United States Patent [19]

Garland

[11] Patent Number: 4,860,591
[45] Date of Patent: Aug. 29, 1989

[54] GAS-LIQUID SEPARATION AND FLOW MEASUREMENT APPARATUS

[75] Inventor: Emmanuel Garland, St. Gaudens, France

[73] Assignee: Societe Nationale Elf Aquitaine (Production), La Defense, France

[21] Appl. No.: 148,649

[22] Filed: Jan. 26, 1988

[30] Foreign Application Priority Data

Jan. 26, 1987 [FR] France .................................. 87 00854

[51] Int. Cl.$^4$ ............................................. G01F 1/08
[52] U.S. Cl. .................................. 73/861.04; 73/200; 55/36
[58] Field of Search ................. 73/200, 861.04; 55/36, 55/52, 55, 189, 190, 191, 192, 193, 199

[56] References Cited

U.S. PATENT DOCUMENTS

| | | | |
|---|---|---|---|
| 1,255,018 | 1/1918 | Jones ......................................... | 55/36 |
| 2,882,724 | 4/1959 | Smith .................................... | 73/200 |
| 2,971,376 | 2/1961 | Glasgow et al. ....................... | 73/200 |
| 3,776,385 | 12/1973 | Maciula et al. ......................... | 55/52 |
| 3,996,027 | 12/1976 | Schnell et al. .......................... | 55/36 |
| 4,613,349 | 9/1986 | Drapp et al. ............................ | 73/200 |
| 4,688,418 | 8/1987 | Cheung et al. .......................... | 73/200 |

FOREIGN PATENT DOCUMENTS 1208121 10/1970 United Kingdom .
2089049 6/1982 United Kingdom .

Primary Examiner—Herbert Goldstein
Attorney, Agent, or Firm—Fleit, Jacobsen, Cohn, Price, Holman & Stern

[57] ABSTRACT

A gas-liquid mixture consisting in particular of a petroleum product supplied to a feed pipe in a dynamic flow regime is subjected to a vortical gravity-separation process so as to form two separate streams of gas and liquid for separate measurements of their flow rates, the streams being then combined for final dynamic discharge through a common pipe.

2 Claims, 2 Drawing Sheets

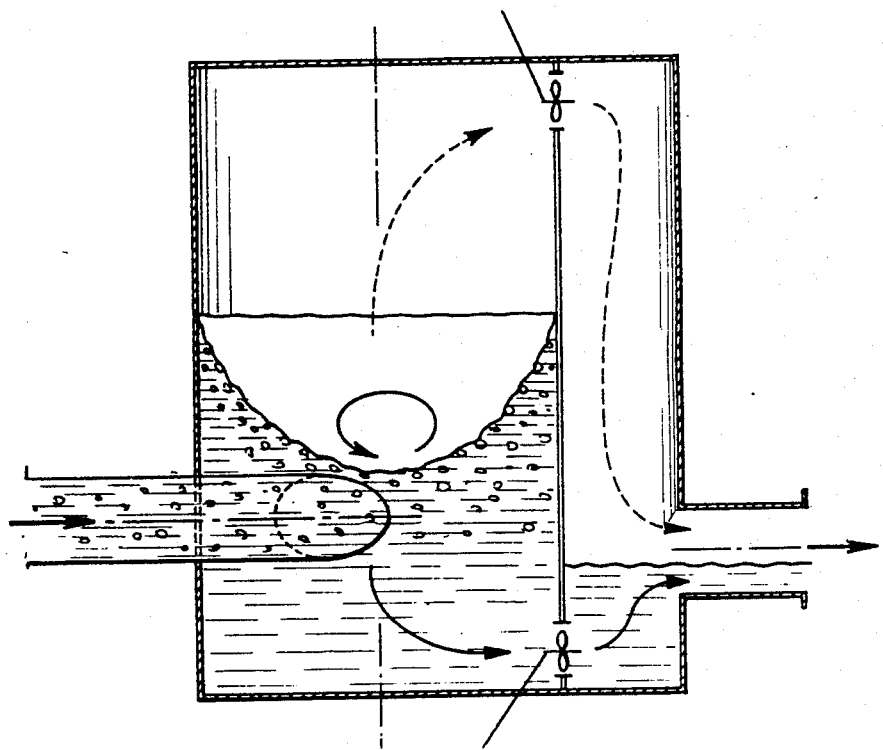
FIG_1

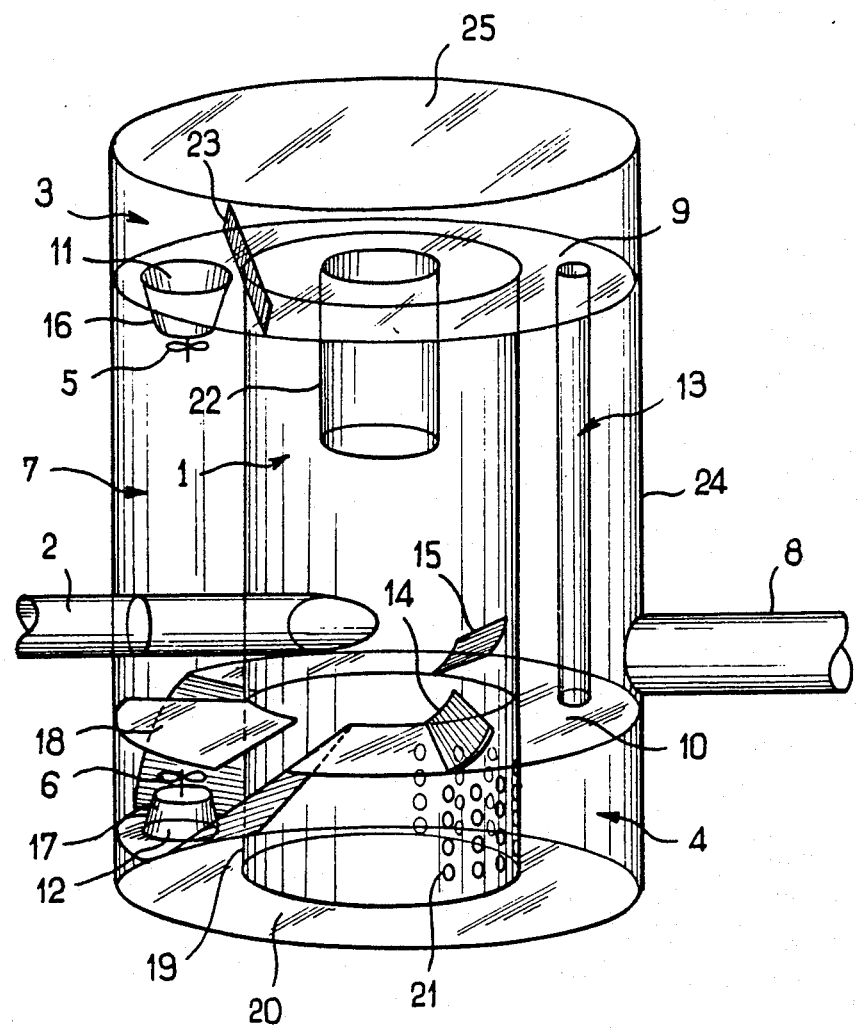
FIG_2

GAS-LIQUID SEPARATION AND FLOW MEASUREMENT APPARATUS

BACKGROUND OF THE INVENTION

1. Field of the Invention

The present invention relates to the industry of instruments for measuring flow rates of fluids including petroleum products. The invention is more specifically directed to a method and an apparatus which carry out said method in order to measure the quantities of gas and liquid delivered in a gas-liquid mixture as it circulates within a duct without interrupting the flow.

One application for which the invention is particularly well-suited is operational control of oil wells under gas extraction and of wells which produce a mixture of gas and oil.

2. Description of the Prior Art

The methods and devices employed up to the present time or proposed for such measurements of flow rates have failed to give reliable industrial results and are usually very complex. Some systems involve the measurement of two different physical parameters such as velocity of sound and $\gamma$-radiation whilst other systems of a more mechanical type have variable-pitch blades which are automatically adjustable as a function of the mean density of the fluid being transferred. Other devices for measuring multi-phase fluids have recourse to homogenization followed by sampling for analysis as described in U.K. Pat. No. 2,128,756.

Equipment units are also known for the purpose of separating gas and liquid in a mixture such as crude oil. The majority of these units involve settling in large tanks whilst other units make use of cyclones which are often mounted in series, as in Canadian Pat. No. 1,093,017, or in a complex structure as in Canadian Pat. No. 1,136,061. These large installations are neither suitable nor adaptable to sea-shore or offshore platform extractions and introduce considerable disturbances. In particular, they call for separate piping systems for conveying gas and liquid between the wellhead and the raw-product processing location.

The object of the invention is therefore to permit separate counting of gas and liquid in a more or less homogeneous gas-liquid mixture without interrupting the transfer of this latter, the apparatus employed for this purpose being simple, reliable and inexpensive to produce.

SUMMARY OF THE INVENTION

The invention is directed to a method for continuously and respectively measuring the quantities of gas and liquid in a dynamic flow of a gas-liquid mixture and especially a petroleum product. The method is distinguished by the fact that the mixture delivered by a feed pipe is divided into two separate streams of gas and liquid, that the rate of flow in each of the two streams is measured, and that the two streams are then collected in a common discharge pipe.

Preferably, a gravity separation process is performed on the gas and liquid by subjecting the gas-liquid mixture to vortical flow motion within an enclosure, by withdrawing at the base of the enclosure the liquid which is caused to flow towards a device for measuring the rate of flow of liquid, and by withdrawing at the top of said enclosure the gas which is caused to flow towards a device for measuring the rate of flow of gas before finally combining and discharging the streams of gas and liquid.

The invention is also directed to a two-phase separator-counter for the implementation of said method, this device being distinguished by the fact that it includes a vertical-axis vortex enclosure into the central portion of which opens tangentially a pipe for supplying a mixture of gas and liquid under pressure, that the vortex enclosure opens into a gas collector at the top end thereof and opens into a liquid collector at the bottom end thereof, that the gas and liquid collectors each communicate through a flow meter respectively for gas and liquid with a collecting chamber which opens into a single pipe for discharging the combined gas and liquid under pressure.

An advantageous embodiment of the separator-counter in accordance with the invention is distinguished by the fact that the vertical annular collecting chamber surrounds the vortex enclosure, that the flat cylindrical gas and liquid collectors having the same diameter as the collecting chamber are each separated from this latter respectively by a horizontal partition-wall pierced by a passage for delivering gas and liquid respectively to a flow measurement turbine, that a drainage pipe passes through the collecting chamber and establishes a communication between the bottom portion of the gas collector and the top portion of the liquid collector, and that the discharge pipe opens laterally in proximity to the base of the collecting chamber.

A separator-counter of this type advantageously includes two variable-slope weirs placed on the bottom wall of the collecting chamber, respectively on each side of the discharge pipe outlet orifice in order to maintain a constant level of liquid above the liquid flow measurement turbine.

In a practical form of construction, each flow measurement turbine is housed at the exit of a convergent duct, the outlet of the liquid flow measurement turbine being located opposite to a horizontal deflector for preventing any formation of a wave of liquid within the collecting chamber.

In one constructional arrangement, a separator-counter in accordance with the invention is distinguished by the fact that the base of the vortex enclosure has an axial extension within the liquid collector, said base being closed by a horizontal partition-wall, the side wall of said base being pierced by a plurality of radial orifices grouped together on the side remote from the liquid flow measurement turbine in order to establish a communication between the interior of the enclosure and the interior of the liquid collector, and that the gas collector is provided in the top portion of the vortex enclosure with an extension in the form of an open axial chimney having a smaller diameter than said enclosure.

Advantageously, the passage for the supply of gas to the gas flow measurement turbine is protected by a flange which projects from the bottom wall of the gas collector against any accidental flow of liquid which might be entrained by the gas, thus running-off within the gas collector.

BRIEF DESCRIPTION OF THE DRAWINGS

FIG. 1 is an explanatory diagram of the method in accordance with the invention.

FIG. 2 is a schematic view in perspective showing a two-phase separator-counter in accordance with the invention.

DETAILED DESCRIPTION OF THE INVENTION

The method in accordance with the invention is apparent from the diagram of FIG. 1. The mixture arrives tangentially in a cylindrical enclosure in which it acquires a vortical flow motion by virtue of its own velocity, thus resulting in separation of the gas and the liquid under the action of gravity. The gas and liquid streams are counted separately, then gathered for discharge. Thus the flow of the gas and liquid phases in the gas-liquid mixture is not interrupted, no sampling operation is performed, temporary separation takes place automatically and the mixture is conveyed by means of a single pipe without any inconvenient pressure drop.

The mode of construction of a two-phase separator-counter in accordance with the invention as shown by way of example in FIG. 2 essentially comprises a vertical cylindrical vortex enclosure 1 into the central portion of which opens tangentially a pipe 2 for supplying under pressure the gas-liquid mixture to be measured. Said enclosure 1 is surrounded by a second or outer, concentric, cylindrical enclosure 24 which is closed at both ends by end-walls 20, 25. Two diametrical annular partition-walls 9 and 10 delimit respectively, at the top end, a gas-collecting chamber 3 which communicates with the upper portion of the vortex enclosure 1 by means of an open chimney 22 which penetrates into the upper portion of the enclosure and, at the bottom end, an annular liquid-collecting chamber 4 which is traversed by the base of the vortex enclosure 1.

Said base 19 is pierced laterally by a plurality of orifices 21 grouped together over approximately one-third of the periphery. These orifices 21 serve to establish a free radial communication between the interior of the enclosure 1 and the liquid-collecting chamber 4.

An annular gas-liquid mixture collecting chamber 7 is delimited between the vortex enclosure 1, the outer enclosure 24 and the annular partition-walls 9 and 10. Said annular collecting chamber 7 communicates freely at its lower end, near the lower partition-wall 10, with a radial discharge pipe 8. Said chamber 7 also communicates with the upper gas-collecting chamber 3 by means of a passage 11 having an extension in the form of a convergent duct 16 which serves as a housing for a gas flow measurement turbine 5, and with the lower liquid-collecting chamber 4 by means of a passage 12 having an extension in the form of a convergent duct 17 in which is mounted a liquid flow measurement turbine 6. These convergent ducts 16 and 17 have the function of producing a flow stream at a velocity which is best suited to the operation of the associated turbines 5 and 6.

A flange 23 which projects from the partition-wall 9 into the gas-collecting chamber 3 protects the passage 11 and consequently the turbine 5 from any accidental flow of liquid which might otherwise be carried by the gas stream into the gas-collecting chamber 3.

The lower partition-wall 10 is bent downwards on the side located diametrically opposite to the orifices 21 of the vortex enclosure 1 in order to ensure submersion of the flow measurement turbine 6 and to protect this latter against any possible disturbances by the streams of liquid as they pass through the orifices 21. A horizontal deflector 18 located in the axis of the turbine 6 has the function of separating the stream of liquid into two symmetrical side streams as it passes out of the turbine 6, thus preventing the formation of waves within the mixture-collecting chamber 7.

Two adjustable-slope weirs 14, 15 derived from the lower partition-wall 10 within the mixture-collecting chamber 7 are located symmetrically and radially at an angle of approximately 90° on each side of the outlet orifice of the discharge pipe 8 in the mixture-collecting chamber 7. These weirs serve to maintain the liquid at a constant level above the liquid flow measurement turbine 6, namely the level which is best suited for efficient operation of said turbine.

A tubular drainage pipe 13 extending from top to bottom within the mixture-collecting chamber 7 opens freely through the upper partition-wall 9 into the gas-collecting chamber 3 and through the lower partition-wall 10 into the liquid-collecting chamber 4 in proximity to the orifices 21 of the vortex enclosure 1. The drainage pipe 13 makes it possible on the one hand for any gas bubbles which may have been entrained by the liquid into the liquid-collecting chamber 4 to escape towards the gas-collecting chamber 3 and on the other hand for any liquid droplets which may have been entrained by the gas into the gas-collecting chamber 3 to run-off towards the liquid-collecting chamber 4. Moreover, the drainage pipe 13 ensures continuous pressure-equalization between the gas-collecting chamber 3 and the liquid-collecting chamber 4.

The two-phase separator-counter described in the foregoing can readily be constructed of sheet metal, is inexpensive to produce, is designed for independent operation, and does not interfere with the general transfer of the mixture within the conveying duct.

The orifices 21 have the function of protecting the liquid flow measurement turbine 6 against damage caused by any solid substances which might be carried along by the mixture, in much the same manner as a strainer. It may prove advantageous to group these orifices together in a readily replaceable and removable plate fixed in a corresponding large opening of the base of the vortex enclosure 1.

By way of approximate dimensional example, in order to count the gas and the liquid in gas-oil containing bubbles or pockets of gas and conveyed within a pipe 2, 8 having an internal diameter of approximately 7.37 cm at a pressure of approximately 5 bar and a flow rate of approximately 200 $m^3$ per day, there will be employed a cylindrical vortex enclosure 1 of revolution having a diameter of approximately 30 cm with a free height of approximately 60 cm above the feed pipe 2. The outer enclosure 24 will have a diameter of approximately 46 cm and a height of approximately 100 cm. The vortex enclosure 1 will be pierced by approximately 55 orifices 21 having a diameter of approximately 0.6 cm. The drainage pipe 13 will have a diameter of approximately 2 cm and the gas chimney 22 will have a diameter of approximately 11 cm and a height of 20 cm.

As will readily be apparent, the invention must not be considered as limited to the examples described with reference to the accompanying drawings but can extend on the contrary to many alternative forms of construction and adaptations within the capacity of those versed in the art without thereby departing from the scope or the spirit of the invention.

What is claimed is:

1. A two-phase separator-counter for continuously measuring the respective quantities of gas and liquid in a dynamic flow of a gas-liquid mixture, in which a gas-liquid mixture delivered by a feed pipe is divided into a gas stream and a liquid stream, the rate of flow of the gas stream and of the liquid stream is measured, and the gas stream and liquid stream are then collected in a common single discharge pipe, comprising:
- a vertical-axis vortex enclosure into a central portion of which tangentially opens a feed pipe for delivering a dynamic flow of a gas-liquid mixture, said vortex enclosure subjecting the gas-liquid mixture flow to a gravity separation,
- a verticular annular collecting chamber surrounding the vortex enclosure
- a flat cylindrical gas collecting chamber provided atop the top end of the vortex enclosure and having a diameter the same as that of the verticular annular collecting chamber, the gas collecting chamber being separated from the vertical annular collecting chamber by a first horizontal partition wall, the vortex enclosure opening at its top end into said gas collecting chamber,
- a flat cylindrical liquid collecting chamber provided below the bottom end of the vortex enclosure and having a diameter the same as that of the vertical annular collecting chamber, the liquid collecting chamber being separated from the vertical annular collecting chamber by a second horizontal partition wall, the vortex enclosure opening at its bottom end into said liquid collecting chamber,
- a gas passage piercing the first horizontal partition wall for communicating the gas collection chamber with the vertical annular collection chamber, a gas flow measurement turbine being provided in the gas passage,
- a liquid passage piercing the second horizontal partition wall for communicating the liquid collection chamber with the vertical annular collection chamber, a liquid flow measurement turbine being provided in the liquid passage,
- a drainage pipe passing through the vertical annular collecting chamber and communicating a bottom portion of the gas collection chamber with a top portion of the liquid collection chamber, and
- a discharge pipe opening laterally into the vertical annular collecting chamber proximate a base thereof.

2. A two-phase separator-counter for continuously measuring the respective quantities of gas and liquid in a dynamic flow of a gas-liquid mixture, in which a gas-liquid mixture delivered by a feed pipe is divided into a gas stream and a liquid stream, the rate of flow of the gas stream and of the liquid stream is measured, and the gas stream and liquid stream are then collected in a common single discharge pipe, comprising:
- a vertical-axis vortex enclosure into a central portion of which tangentially opens a feed pipe for delivering a dynamic flow of a gas-liquid mixture, said vortex enclosure having a top end and a bottom end, said vortex enclosure subjecting the gas-liquid mixture flow to a gravity separation,
- a verticular annular collecting chamber surrounding the vortex enclosure
- a flat cylindrical gas collecting chamber provided atop the top end of the vortex enclosure and having a diameter the same as that of the verticular annular collecting chamber, the gas collecting chamber being separated from the vertical annular collecting chamber by a first horizontal partition wall, the vortex enclosure opening at its top end into said gas collecting chamber via an open axial chimney extending from the gas collecting chamber into the vortex enclosure, said open axial chimney having a diameter smaller than that of the vortex enclosure,
- a flat cylindrical liquid collecting chamber provided below the bottom end of the vortex enclosure and having a diameter the same as that of the vertical annular collecting chamber, the liquid collecting chamber being separated from the vertical annular collecting chamber by a second horizontal partition wall, the vortex enclosure communicating at its bottom end with said liquid collecting chamber via an axial extension of the vortex chamber within the liquid collecting chamber, the vortex chamber axial extension being closed at a base thereof by a partition wall and having a side wall, the side wall of said vortex chamber axial extension being pierced at one side thereof with a plurality of radial orifices for establishing communication between the vortex chamber and liquid collecting chamber,
- a convergent gas duct piercing the first horizontal partition wall, the gas duct communicating at an inlet thereof with the gas collection chamber and at an outlet thereof with the vertical annular collection chamber, a gas flow measurement turbine being provided in the outlet of the gas duct,
- a convergent liquid duct piercing the second horizontal partition wall, the liquid duct being located at a side of said second horizontal partition wall remote from the plurality of radial orifices in the vortex chamber axial extension side wall, the liquid duct communicating at an inlet thereof with the liquid collection chamber and at an outlet thereof with the vertical annular collection chamber, a liquid flow measurement turbine being provided in the outlet of the liquid duct,
- a flange projecting from a bottom wall of the gas collecting chamber proximate the gas duct inlet for protecting the gas flow measurement turbine against accidental flow of any liquid entrained by gas flowing in the gas collecting chamber and for trapping and running-off said entrained liquid,
- a horizontal deflector provided in the vertical annular collection chamber opposite an outlet of the liquid flow measurement turbine for preventing formation of a wave of liquid within the vertical annular collection chamber,
- a drainage pipe passing through the vertical annular collecting chamber and communicating a bottom portion of the gas collection chamber with a top portion of the liquid collection chamber,
- a discharge pipe opening laterally into the vertical annular collecting chamber proximate a base thereof, and
- a pair of adjustable-slope weirs provided on a bottom wall of the vertical annular collection chamber on each respective side of the discharge pipe opening thereinto, for maintaining a constant liquid level above the liquid flow measurement turbine.

* * * * *